United States Patent
Nguyen et al.

(10) Patent No.: US 12,335,505 B2
(45) Date of Patent: Jun. 17, 2025

(54) DETERMINING A PARAMETRIZATION FOR CONTEXT-ADAPTIVE BINARY ARITHMETIC CODING

(71) Applicant: FRAUNHOFER-GESELLSCHAFT ZUR FÖRDERUNG DER ANGEWANDTEN FORSCHUNG E.V., Munich (DE)

(72) Inventors: Phan Hoang Tung Nguyen, Berlin (DE); Benjamin Bross, Berlin (DE); Heiko Schwarz, Berlin (DE); Detlev Marpe, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 72 days.

(21) Appl. No.: 17/789,993

(22) PCT Filed: Dec. 29, 2020

(86) PCT No.: PCT/EP2020/088001
§ 371 (c)(1),
(2) Date: Jun. 29, 2022

(87) PCT Pub. No.: WO2021/136789
PCT Pub. Date: Jul. 8, 2021

(65) Prior Publication Data
US 2023/0044030 A1 Feb. 9, 2023

(30) Foreign Application Priority Data

Dec. 30, 2019 (EP) ..................... 19220126

(51) Int. Cl.
*H04N 19/46* (2014.01)
*H04N 19/174* (2014.01)
*H04N 19/176* (2014.01)

(52) U.S. Cl.
CPC .......... *H04N 19/46* (2014.11); *H04N 19/174* (2014.11); *H04N 19/176* (2014.11)

(58) Field of Classification Search
CPC ..... H04N 19/46; H04N 19/174; H04N 19/176
See application file for complete search history.

(56) References Cited

U.S. PATENT DOCUMENTS

2020/0177882 A1* 6/2020 Yoo ........................ H04N 19/124
2021/0112279 A1* 4/2021 Karczewicz ........... H04N 19/46
2021/0385478 A1* 12/2021 Yoo ......................... H04N 19/70

OTHER PUBLICATIONS

JVET-Q0070-v2; Ma et al.; CE3-2.5: Residual coding selection signaling for lossless coding; Dec. 24, 2019 (Year: 2019).*
International Search Report dated Mar. 26, 2021, for PCT/EP2020/088001, 3 pp.

(Continued)

*Primary Examiner* — Jonathan R Messmore
(74) *Attorney, Agent, or Firm* — NIXON & VANDERHYE P.C.

(57) ABSTRACT

A video decoder employs context-adaptive binary arithmetic coding for decoding a video from a data stream. The video decoder determines a parametrization for the context-adaptive binary arithmetic coding.

6 Claims, 6 Drawing Sheets

(56) References Cited

OTHER PUBLICATIONS

Written Opinion of the International Searching Authority dated Mar. 26, 2021, for PCT/EP2020/088001, 8 pp.
Tung-Chuan MA et al., "CE3-2.5: Residual coding selection signaling for lossless coding", 17. JVET Meeting, Jan. 7, 2020-Jan. 17, 2020, Brussels, (The Joint Video Exploration Team of ISO/IEC JTC1/SC29WG11 and ITU-T SG. 16), No. JVET-Q0070, m51658, retrieved Dec. 25, 2019, XP030222496, Retrieved from the Internet: URL: http://phenix.int-evry.fr/jvet/doc_end_user/documents/17_Brussels/wg11/JVET-Q0070-v2.zip, JVET-Q0070-V2.docx, 4 pp.
T. Nguyen et al., "Description of Core Experiment 3 (CE3): Lossless Coding", 16. JVET Meeting, Oct. 1, 2021-Oct. 1, 2019, Geneva, (The Joint Video Exploration Team of ISO/IEC JTC1/SC29/WG11 and ITU-T SG.16), No. JVET-P2023, m51514, retrieved Dec. 18, 2019, XP030224343, Retrieved from the Internet: URL: http://phenix.int-evry.fr/jvet/doc_end_user/documents/16_Geneva/wg11/JVET-P2023-v3.zip, JVET-P2023-v3.docx, 12 pp.
Benjamin Bross et al., "AHG18: Enabling lossless coding with minimal impact on VVC design", 16. JVET Metting, Oct. 1, 2019-Oct. 11, 2019, Geneva, (The Joint Video Exploration Team of ISO/IEC JTC1/SC29/WG11 and ITU-T SG.16), No. JVET-P0606, m50583, retrieved Oct. 4, 2019, XP030217833, retrieved from the Internet: http://phenix.int-evry.fr/jvet/doc_end_user/documents/16_Geneva/wg11/JVET-P0606-v2.zip, JVET-P0606-v2/JVET-P0606-v2.docx, 6 pp.
Benjamin Bross et al., "Versatile Video Coding (Draft 7)", 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P2001, m51515, retrieved Nov. 14, 2019, XP030224330, retrieved from the Internet: URL: http://phenix.int-evry.fr/jvet/doc_end_user/documents/16_Geneva/wg11/JVET-P2001-v14.zip, JVET-P2001-vE.docx, 494 pp.
Bross et al: "Versatile Video Coding (Draft 9)", 130. MPEG Meeting; Apr. 20, 2020-Apr. 24, 2020;ALPBACH; (Motion Picture Expert Group or ISO/IEC JTC1/SC29/WG11), No. m53983 ; JVET-R2001, May 12, 2020 (May 12, 2020), XP030287935, Retrieved from the Internet: URL:http://phenix.int-evry.fr/mpeg/doc_end_user/documents/130_Alpbach/wg11/m53983-JVET-R2001-v9-JVET-R2001-v9.zipJVET-R2001-v9.docx [retrieved on May 12, 2020], 524 pages.
Choi (LGE) et al: "CE3-2.7: Luma and chroma BDPCM and IBC with TSRC for lossless coding", 17. JVET Meeting; Jan. 7, 2020-Jan. 17, 2020; Brussels; (The Joint Video Exploration Team of ISO/IEC JTC1/SC29/WG11 and ITU-T SG.16 ), No. JVET-Q0082 ; m51671 Dec. 24, 2019 (Dec. 24, 2019), XP030222526, Retrieved from the Internet: URL:http://phenix.int-evry.fr/jvet/doc_end_user_user/documents/17_Brussels/wg11/JVET-Q0082-vl.zipJVET-Q0082.docx [retrieved on Dec. 24, 2019], 3 pages.

* cited by examiner

DETERMINING A PARAMETRIZATION FOR CONTEXT-ADAPTIVE BINARY ARITHMETIC CODING

This application is the U.S. national phase of International Application No. PCT/EP2020/088001 filed Dec. 29, 2020 which designated the U.S. and claims priority to EP Application Serial No. 19220126.7 filed Dec. 30, 2019, the entire contents of each of which are hereby incorporated by reference.

TECHNICAL FIELD

Embodiments of the invention relate to video decoders and encoders as well as to methods for encoding and decoding a video. Embodiments of the invention relate to a residual coding design for wide-ranging operation points.

BACKGROUND

Video coding standards are usually designed for real-world applications, and hence, designed for the requirements of the application such as chroma format, spatial resolution, or the typical bit-rate range. However, a non-typical operation range is also supported, but operation points lying in such an operation range are not optimized. For high and very high bit rates, and also for the lossless operation mode, the signal characteristic becomes different, and thus, a dedicated design is beneficial. Nevertheless, such a dedicated design is undesirable since it introduces additional implementation efforts and resources.

In the context of the residual coding stage, i.e., the coding of the output signal after transform and quantization from encoder point-of-view, there exist two different schemes in the current Versatile Video Coding (VVC) Draft. The first design, the regular residual coding (RRC), is suitable for camera-captured content, whereas the second design, the Transform Skip Residual Coding (TSRC), is suitable for screen content. Although the two residual coding stages are different, they share a typical coding structure. The selection between RRC and TSRC depends on the usage of the Transform Skip Mode (TSM) and is implicit. In the TSM, the transform is bypassed which is equal to use an identity transform, resulting an output signal to the quantization stage that is within the spatial domain.

SUMMARY

It would be desirable to have a video coding concept which provides an improved tradeoff between a high flexibility in the application of residual coding and low implementation effort. Embodiments of the present invention rely on the idea to allow a flexible choice of a parametrization for a residual coding using context adaptive binary arithmetic coding (CABAC) with respect to a choice of a transform for a transformation of a prediction residual.

An embodiment according to the invention provides a video decoder. The video decoder is configured to reconstruct a video using prediction and transform based residual decoding. Further, the video decoder is configured to support a set of transforms for the transform based residual decoding which includes an identity transform. Further, the video decoder is configured to determine, for each of transform blocks of pictures of the video, out of the set of transforms one transform at which a prediction residual for the respective transform block is coded into a data stream. For example, the decoder may perform the determination of the transform by use of certain syntax elements in the data stream which may be transmitted in the data stream at transform block level, or in units of blocks larger then transform blocks such as coding blocks at units of which the inter/intra prediction decision is done, and, optionally, by use of characteristics of respective transform bock, such as its size or whether same relates to an intra-predicted or inter-predicted portion of the video. Further, the video decoder is configured to support a set of quantization parameters for the transform based residual decoding which includes predetermined quantization parameter corresponding to a quantization step size of one. Further, the video decoder is configured to determine, for each of the transform blocks of pictures of the video, out of the set of quantization parameters one quantization parameter using which the prediction residual for the respective transform block is quantized and coded into the data stream. For example, the decoder may perform the determination of the quantization parameter by use of certain syntax elements in the data stream which may be transmitted in the data stream at transform block level, or in units of blocks larger then transform blocks such as coding blocks at units of which the inter/intra prediction decision is done, and, optionally, by prediction from previously used quantization parameters for previous transform blocks. Further, the video decoder is configured to perform, for each transform block, for which the one transform is unequal to the identity transform, a reverse transform of the one transform on residual values decoded from the data stream for the respective transform block. Further, the video decoder is configured to perform, for each transform block, for which the one quantization parameter is unequal to the predetermined quantization parameter, a scaling of quantization indices decoded from the data stream for the respective transform block so as to obtain the residual values. Further, the video decoder is configured to decode the quantization indices from the data stream using context-adaptive binary arithmetic decoding. Further, the video decoder is configured to support a set of parametrizations of the context-adaptive binary arithmetic decoding. Further, the video decoder is configured to determine, for each of the transform blocks of pictures of the video or for each sub-block into which the respective transform block is subdivided or for each quantization index of the respective transform block, out of the set of parametrizations one parametrization using which the context-adaptive binary arithmetic decoding is parametrized.

In one alternative, the video decoder is configured to perform the determination of the one parametrization in a manner allowing, for a first predetermined transform block, for which the one transform is equal to the identity transform, the one parametrization to be a first parametrization, the manner further allowing, for a second predetermined transform block, for which the one transform is unequal to the identity transform, the one parametrization to be the first parametrization. Thus, the decoder may use the first parametrization in cases in which the one transform equals the identity transform and in cases in which the one transform is unequal to the identity transform, providing a high flexibility in the choice of the one parametrization with respect to the choice of the one transform. In particular, compared to implementations which do not allow such choice of the one parametrization, the inventive concept allows for a use of the first parametrization in a higher number of use cases without additional implementation effort for an additional parametrization. A high flexibility in the choice of the one parametrization allows to adapt the one parametrization to the video to be decoded, enabling a higher coding efficiency.

Additionally or alternatively, the video decoder is configured to perform the determination of the one parametrization for a predetermined transform block in a manner depending on the one quantization parameter determined for the predetermined transform block. Thus, the choice of the one parametrization may be adapted to the choice of the quantization parameter.

Additionally or alternatively, the video decoder is configured to perform the determination of the one parametrization for a predetermined transform block in a manner depending on one or more first syntax elements in the data stream which are disjoint to one or more second syntax elements depending on which the decoder is configured to perform the determination of the one transform for the predetermined transform block. As the decoder determines the one parametrization in dependence on the one or more first syntax elements which are disjoint to the second syntax elements, the one parametrization and the one transform may be signaled, by means of the first and second syntax elements, so that the one parametrization the one transform do not necessarily depend on each other. Thus, the choice of one of the one parametrization and the one transform does not necessarily imply the choice of the other one of the one parametrization one transform. Thus, this signaling allows for a flexible combination of parametrizations and transforms, so that the video decoder allows for a flexible choice of the one parametrization, e.g. under consideration of the video to be decoded.

Additionally or alternatively, the video decoder is configured to perform the determination of the one parametrization depending on one or more previously decoded quantization indices.

Each of the four alternatives may apply individually. Thus, for example, an embodiment according to the second alternative provides a video decoder configured to reconstruct a video using prediction and transform based residual decoding. The video decoder is further configured to support a set of transforms for the transform based residual decoding which includes an identity transform. The video decoder is further configured to determine, for each of transform blocks of pictures of the video, out of the set of transforms one transform at which a prediction residual for the respective transform block is coded into a data stream. The video decoder is further configured to support a set of quantization parameters for the transform based residual decoding which includes predetermined quantization parameter corresponding to a quantization step size of one. The video decoder is further configured to determine, for each of the transform blocks of pictures of the video, out of the set of quantization parameters one quantization parameter using which the prediction residual for the respective transform block is quantized and coded into the data. The video decoder is further configured to perform, for each transform block, for which the one transform is unequal to the identity transform, a reverse transform of the one transform on residual values decoded from the data stream for the respective transform block. The video decoder is further configured to perform, for each transform block, for which the one quantization parameter is unequal to the predetermined quantization parameter, a scaling of quantization indices decoded from the data stream for the respective transform block so as to obtain the residual values. The video decoder is further configured to decode the quantization indices from the data stream using context-adaptive binary arithmetic decoding. The video decoder is further configured to support a set of parametrizations of the context-adaptive binary arithmetic decoding. The video decoder is further configured to determine, for each of the transform blocks of pictures of the video or for each sub-block into which the respective transform block is subdivided or for each quantization index of the respective transform block, out of the set of parametrizations one parametrization using which the context-adaptive binary arithmetic decoding is parametrized. The video decoder is further configured to perform the determination of the one parametrization for a predetermined transform block in a manner depending on the one quantization parameter determined for the predetermined transform block.

In further embodiments, the first, the third or the fourth alternative are implemented accordingly.

Another embodiment provides a video encoder configured to encode a video using prediction and transform based residual coding. The video encoder is configured to support a set of transforms for the transform based residual coding which includes an identity transform. The video encoder is configured to determine, for each of transform blocks of pictures of the video, out of the set of transforms one transform at which a prediction residual for the respective transform block is coded into a data stream (e.g. by use of certain syntax elements in the data stream which may be transmitted in the data stream at transform block level, or in units of blocks larger then transform blocks such as coding blocks at units of which the inter/intra prediction decision is done, and, optionally, by use of characteristics of respective transform bock, such as its size or whether same relates to an intra-predicted or inter-predicted portion of the video). The video encoder is further configured to support a set of quantization parameters for the transform based residual coding which includes predetermined quantization parameter corresponding to a quantization step size of one. The video encoder is further configured to determine, for each of the transform blocks of pictures of the video, out of the set of quantization parameters one quantization parameter using which the prediction residual for the respective transform block is quantized and coded into the data stream (e.g. by use of certain syntax elements in the data stream which may be transmitted in the data stream at transform block level, or in units of blocks larger then transform blocks such as coding blocks at units of which the inter/intra prediction decision is done, and, optionally, by prediction from previously used quantization parameters for previous transform blocks). The video encoder is further configured to perform, for each transform block, for which the one transform is unequal to the identity transform, the one transform to yield residual values and code same into the data stream for the respective transform block. The video encoder is further configured to perform, for each transform block, for which the one quantization parameter is unequal to the predetermined quantization parameter, a scaling of the residual values prior to rounding so as to obtain quantization indices and code same into the data stream for the respective transform block. The video encoder is further configured to code the quantization indices into the data stream using context-adaptive binary arithmetic encoding. The video encoder is further configured to support a set of parametrizations of the context-adaptive binary arithmetic encoding. The video encoder is further configured to determine, for each of the transform blocks of pictures of the video or for each sub-block into which the respective transform block is subdivided or for each quantization index of the respective transform block, out of the set of parametrizations one parametrization using which the context-adaptive binary arithmetic encoding is parametrized. In one alternative, the video encoder is further configured to perform the determination of the one parametrization in a manner allowing, for a first predetermined transform block, for which the one transform is equal to the identity transform, the one parametrization to be a first parametrization, the manner further allowing, for a second predetermined transform block, for which the one transform is unequal to the identity transform, the one parametrization to be the first parametrization. Alternatively or additionally, the video encoder is further configured to perform the determination of the one parametrization for a predetermined transform block in a manner depending on the one quantization parameter determined for the predetermined transform block. Alternatively or additionally, the video encoder is further configured to perform the determination of the one parametrization for a predetermined transform block in a manner depending on one or more first syntax elements in the data stream which are disjoint to one or more second syntax elements depending on which the encoder is configured to perform the determination of the one transform for the predetermined transform block. Alternatively or additionally, the video encoder is further configured to perform the determination of the one parametrization depending on one or more previously encoded quantization indices. As described with respect to the video decoder, the alternatives may be implemented individually.

Further embodiments provide methods performed by any of the video decoders or video encoders.

Further embodiments provide a video bitstream provided by the video encoder.

BRIEF DESCRIPTION OF THE FIGURES

Embodiments of the present disclosure are described in more detail below with respect to the figures, among which.

DETAILED DESCRIPTION OF ILLUSTRATIVE EMBODIMENTS

In the following, embodiments are discussed in detail, however, it should be appreciated that the embodiments provide many applicable concepts that can be embodied in a wide variety of video coding. The specific embodiments discussed are merely illustrative of specific ways to implement and use the present concept, and do not limit the scope of the embodiments. In the following description, a plurality of details is set forth to provide a more thorough explanation of embodiments of the disclosure. However, it will be apparent to one skilled in the art that other embodiments may be practiced without these specific details. In other instances, well-known structures and devices are shown in form of a block diagram rather than in detail in order to avoid obscuring examples described herein. In addition, features of the different embodiments described herein may be combined with each other, unless specifically noted otherwise.

In the following description of embodiments, the same or similar elements or elements that have the same functionality are provided with the same reference sign or are identified with the same name, and a repeated description of elements provided with the same reference number or being identified with the same name is typically omitted. Hence, descriptions provided for elements having the same or similar reference numbers or being identified with the same names are mutually exchangeable or may be applied to one another in the different embodiments.

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIGS. 1 to 3. Thereinafter the description of embodiments of the concept of the present invention is presented along with a description as to how such concepts could be built into the encoder and decoder of FIGS. 1 and 2, respectively, although the embodiments described with the subsequent FIG. 4 and following, may also be used to form encoders and decoders not operating according to the coding framework underlying the encoder and decoder of FIGS. 1 and 2.

Figure 1:
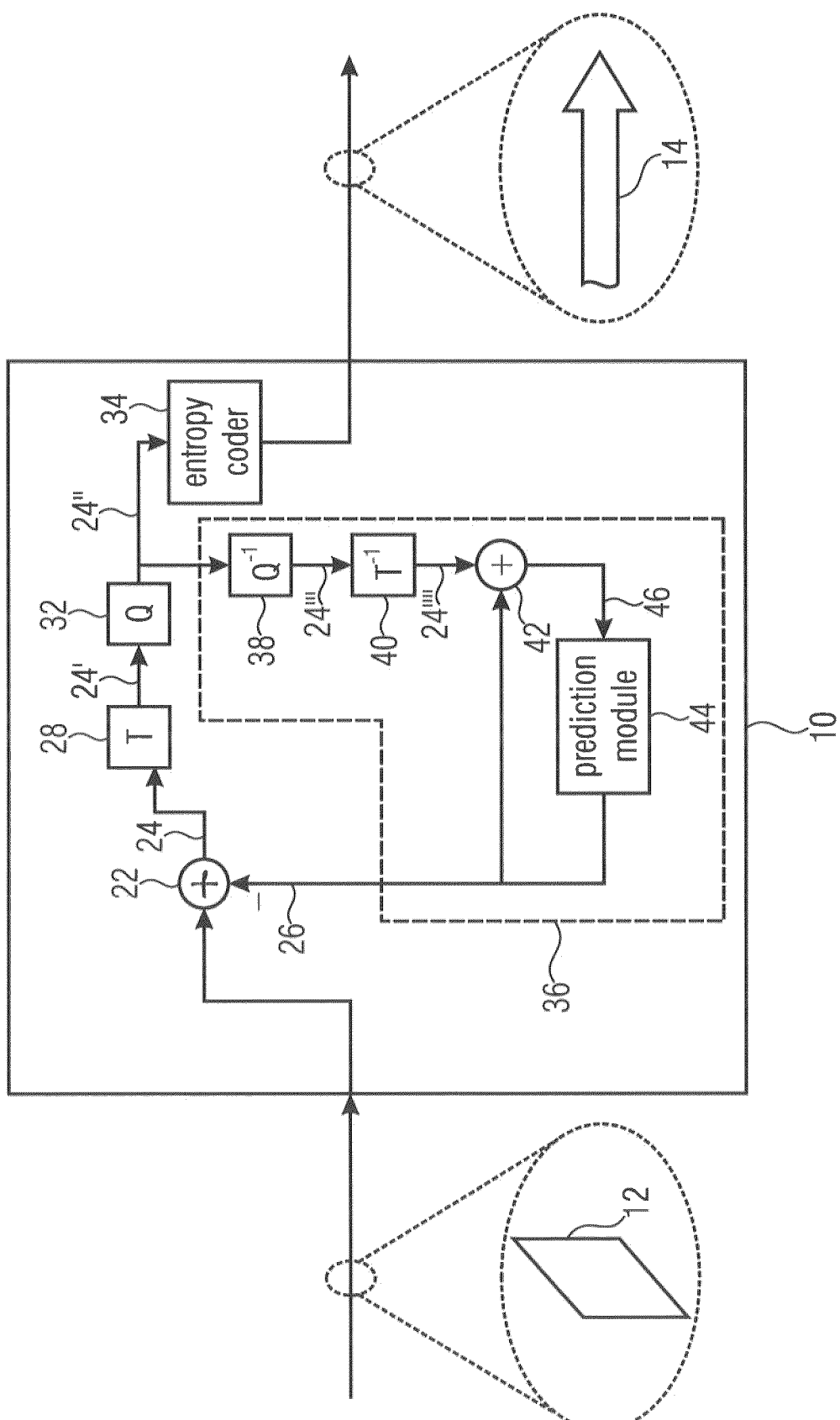
FIG. 1 illustrates a video encoder according to an embodiment.
Figure 2:
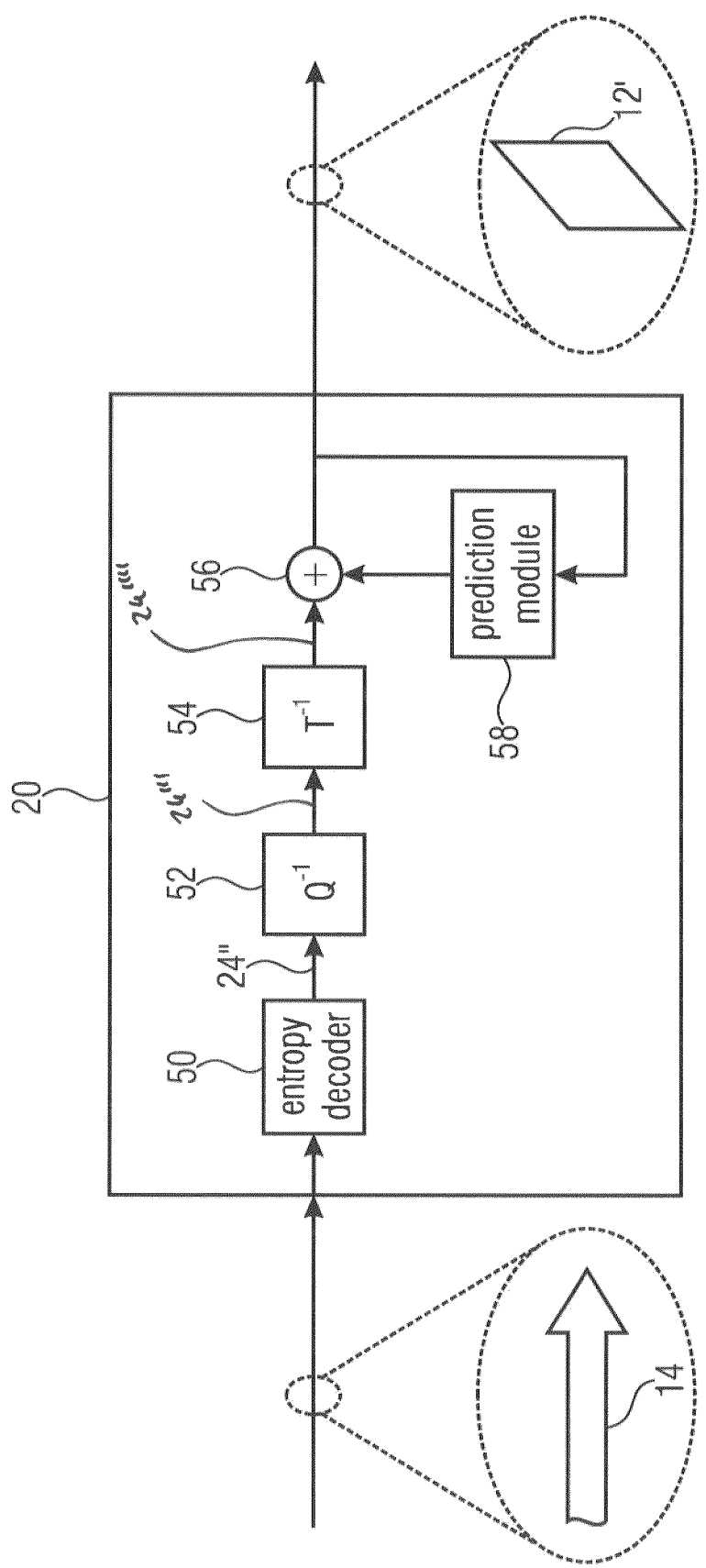
FIG. 2 illustrates a video decoder according to an embodiment.

FIG. 1 shows an apparatus for predictively coding a picture 12 into a data stream 14 exemplarily using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 1 and FIG. 2 exemplarily use transform based prediction residual coding, although embodiments of the present application are not restricted to this kind of prediction residual coding. This is true for other details described with respect to FIGS. 1 and 2, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 2, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
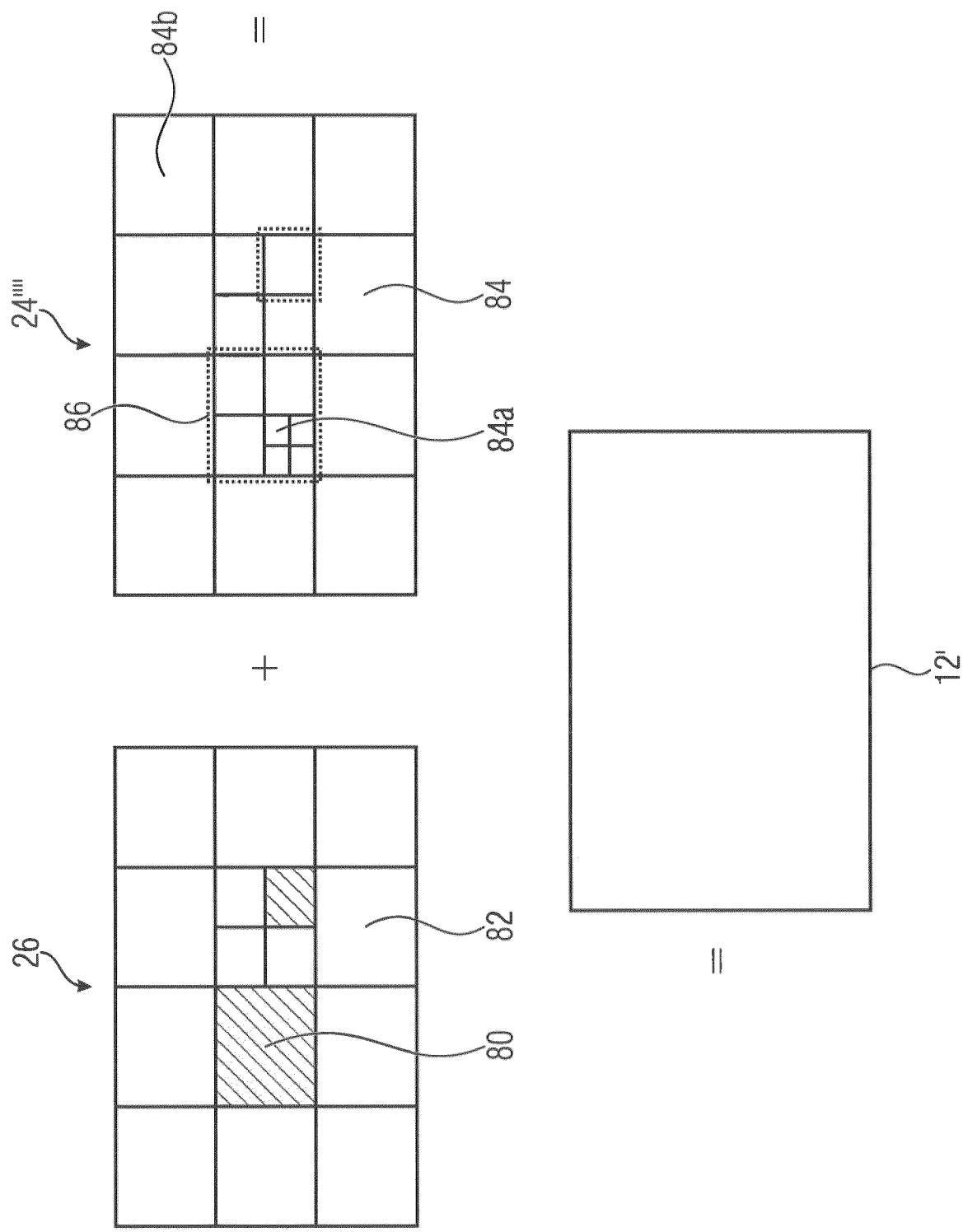
FIG. 3 illustrates an example of a partitioning of a picture into coding blocks and transform blocks.

FIG. 3 illustrates the relationship between the reconstructed signal, i.e. the reconstructed picture 12', on the one hand, and the combination of the prediction residual signal 24'''' as signaled in the data stream 14, and the prediction signal 26, on the other hand. As already denoted above, the combination may be an addition. The prediction signal 26 is illustrated in FIG. 3 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 3 in which the picture area is first subdivided into rows and columns of tree root blocks which are then further subdivided in accordance with a recursive multi-tree subdivisioning into one or more leaf blocks. For example, the picture 12, 12' may be subdivided into coding blocks 80, 82, which may, for example, represent coding tree blocks, and which may be further subdivided into smaller coding blocks 83.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24'''' in FIG. 3 is also illustrated as a subdivision of the picture area into blocks 84. These blocks might be called transform blocks in order to distinguish same from the coding blocks 80 and 82. In effect, FIG. 3 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 3 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 3 further illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

As already outlined above, FIGS. 1 to 3 have been presented as an example where the inventive concept described further below may be implemented in order to form specific examples for encoders and decoders according to the present application. Insofar, the encoder and decoder of FIGS. 1 and 2, respectively, may represent possible implementations of the encoders and decoders described herein below. FIGS. 1 and 2 are, however, only examples. An encoder according to embodiments of the present application may, however, perform block-based encoding of a picture 12 using the concept outlined in more detail below. Likewise, decoders according to embodiments of the present application may perform block-based decoding of picture 12' from data stream 14 using the coding concept further outlined below, but may differ, for instance, from the decoder 20 of FIG. 2 in that same sub-divides picture 12' into blocks in a manner different than described with respect to FIG. 3 and/or in that same does not derive the prediction residual from the data stream 14 in transform domain, but in spatial domain, for instance.

To continue with the description of encoder 10 and decoder 20, different operation modes may be available for the individual processing stages, such as the transformer 28 and the inverse transformer 54, the quantizer 32 and the dequantizer 52, as well as the entropy coder 34 and the entropy decoder 50. For example, a quantization parameter (QP) may define a degree of quantization of the signal 24' by the quantizer 32, and the dequantizer 52, and a degree of scaling of the signal 24'' by the dequantizer 52. Further, as also mentioned in the introductory part, and decoder tenanted decoder 20 may implement a transform skip mode (TSM). In TSM, transformer 28 and inverse transformer 54 may perform an identity transform. In this case, residual signal 24 may correspond to signal 24'.

The current VVC Draft defines a lossless operation mode which may optionally be implemented by encoder 10 and decoder 20. The lossless operation mode is, from the pure technical point-of-view, an encoder only mechanism realized by using a Quantization Parameter (QP) less than or equal to four for 8-bit input signals, and the usage of TSM for all transform blocks. When the QP is less than the threshold, i.e., four in the case of 8-bit input signals, its value is clipped equal to four, resulting in an output sample value that is equal to the input sample value. The decoder has to clip the value too since a finer quantization results in a scaling which is undesirable and not necessary. Using both mechanism results in a lossless operation mode without introducing additional syntax and semantics to the standard. Since TSM implicitly means that TSRC is used instead of the regular residual coding (RRC) stage, the encoder employs TSRC also for camera-captured content in the lossless operation mode. It turned out that the usage of the TSRC for camera-captured content is not suitable, and the invention presents different aspects to solve the problem without designing a dedicated coding path for the different operation modes.

Further, entropy coder 34 and entropy decoder 50 may apply CABAC for encoding and decoding signals 24'' or 14, respectively. CABAC may be implemented with different parametrizations, from which one may be determined for the encoding/decoding process.

For example, the current VVC Draft employs two different residual coding stages, i.e., the Regular Residual Coding (RRC) and the Transform Skip Residual Coding (TSRC) stages, which may be employed by entropy coder 34 and entropy decoder 50. The syntax of the current VVC Draft implicitly specifies TSRC when the Transform Skip Mode (TSM) is enabled. TSM is suitable for screen content, where the signal characteristic is not suitable for energy compaction. A unique situation occurs with the lossless operation mode where the VVC encoder enables it by using TSM and a QP equal to four when the input bit-depth is equal to eight, resulting in the identity transform without quantization at encoder side or scaling at decoder side, respectively.

Both RRC and TSRC share common structures, e.g., the VVC Draft specifies a subdivision of transform blocks larger than 4×4 to disjoint 4×4 sub blocks (SB) and the processing is individually for each SB using the reversed diagonal scanning pattern in the case of RRC and the forward diagonal scanning pattern in the case of TSRC. Specifically, the processing of the SBs uses the same scanning pattern as the processing of the sample positions covered by a SB. The implementation effort can be kept low by using a similar design, particularly, the same processing blocks may be used for both residual coding stages.

In RRC, the signaling starts with the last significant scanning position resulting in the case that some of the SBs within the transform block are inferred to be insignificant. Next, starting with the SB covering the last significant scanning position, all SBs that lie in the path of the reversed scanning pattern are processed as follows.

1. When the CCB budget is greater than or equal to four
   a. sig_flag when not inferred
   b. greater than one flag
   c. parity flag
   d. greater than two flag
2. Remaining absolute levels for the first pass scan positions
3. Remaining absolute levels for the scan positions not processed so far
4. Sign for the significant scanning positions sig_flag: using a template having five neighboring samples, derived the absolute sum (clipped for each scanning position) and the number of significant positions, and the diagonal greater_flags: using the diagonal, and the number of absolute sum from the sig flag derivation minus the number of significant positions Rice parameter: using a template having five neighboring samples, derive the absolute sum and map it to a Rice parameter In contrast to the reversed processing of the RRC, the TSRC processes all SBs within a transform block using the forward diagonal scanning pattern as follows.
1. When the COB budget is greater than or equal to four
   a. sig_flag when not inferred
   b. sign_flag
   c. greater than one flag
   d. parity flag
2. When the COB budget is greater than or equal to four
   a. greater than two flag
   b. greater than four flag
   c. greater than eight flag
   d. greater than ten flag
3. Remaining absolute levels for all scanning positions if applicable
   a. If position not covered by the first coding loop and the position consists of a significant coefficient, transmits the sign flag in bypass mode The syntax of both RRC and TSRC consists of counting variables (counters) and some of the coding loops may be skipped when the counters are smaller than a threshold. The reason for that is to limit the number of context coded bins (CCB) which require more logic, and hence, more processing time. Specifically, the CCB limit for both RRC and TSRC is equal to 1.75 CCB per sample position of a transform block. Such a CCB limitation is the same as adaptive boundaries of the binarization process, particularly, the first bound of the binarization process that separate the Truncated Unary and the Rice codes.

The current TSRC design is not suitable for camera-captured content even if the signal does not undergo a transform that is different from the identity transform. However, in the case of the lossless operation mode, TSRC is applied for camera-captured content since a lossless VVC encoder always selects TSM. A solution to overcome the situation is the usage of a high-level flag (example for "one or more first syntax elements") indicating that RRC should always be used. Alternatively, such a switching flag (example for "one or more first syntax elements") can be signaled at coding structure level such as at coding unit or transform unit level. However, using RRC for lossless improves the compression efficiency for camera-captured content but not screen content. Therefore, the introduction of a high-level flag and/or a low-level signaling mechanism indicating that the current picture or area is screen content is an alternative solution, which is however exactly the same as a flag indicating the usage of RRC or TSRC. Alternatively, a HLS mechanism may be employed indicating for which area of the picture the alternative RC is employed so that the decoder knows the beforehand the switching areas within a picture.

Figure 4:
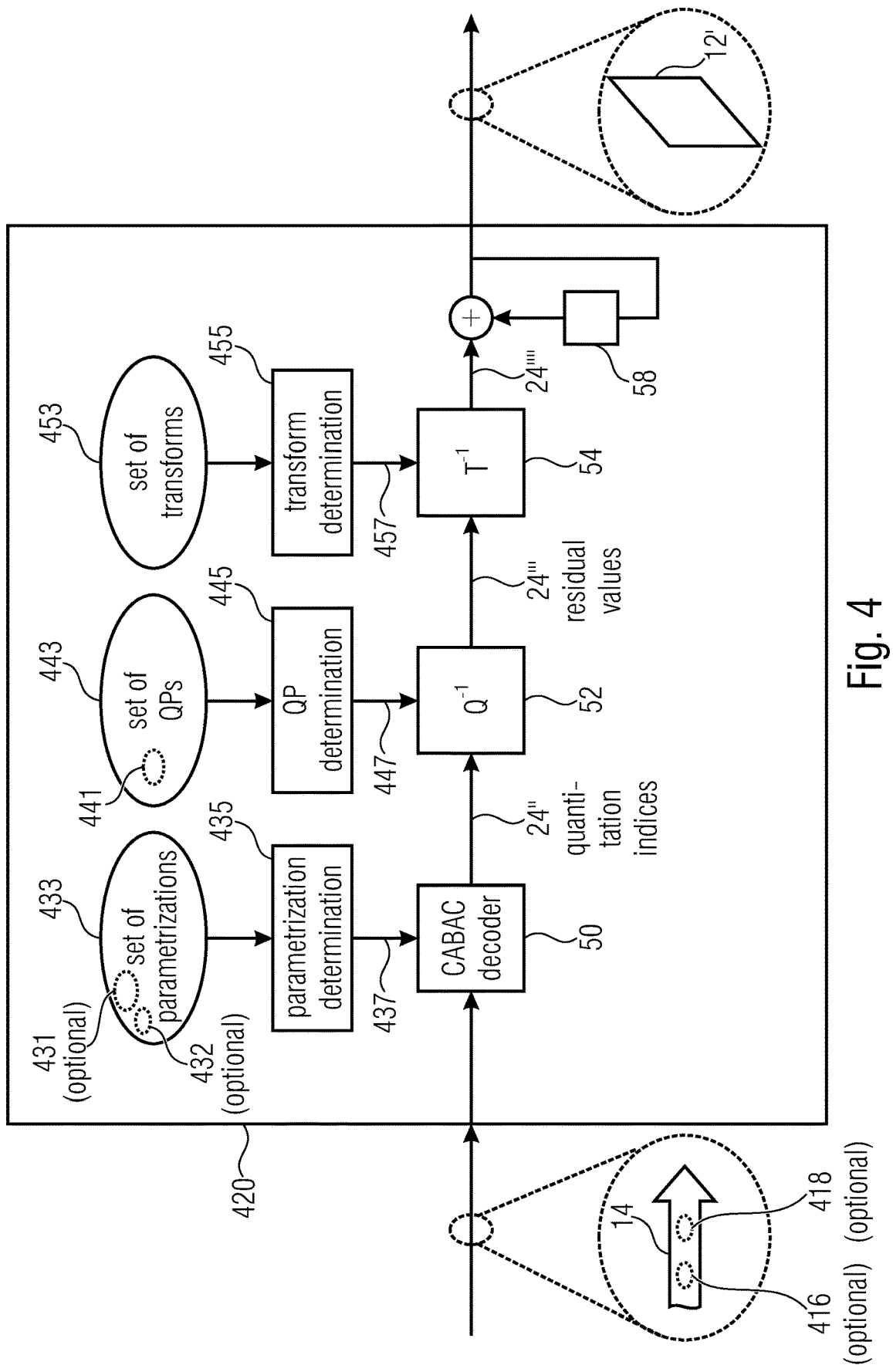
FIG. 4 illustrates a video decoder according to an embodiment.

FIG. 4 shows a block diagram of a video decoder 420 according to an embodiment. The video decoder 420 is configured to reconstruct a video 12 using prediction 58 and transform based residual decoding. The video decoder 420 is configured to support a set of transforms 453 for the transform based residual decoding which includes an identity transform. Video decoder 420 comprises a transform determination module 455 which is configured to determine, for each of transform blocks 84 of pictures 12' of the video, out of the set of transforms 453 one transform 457 at which a prediction residual 24 for the respective transform block 84 is coded into a data stream 14. Further, the video decoder 420 is configured to support a set of quantization parameters 443 for the transform based residual decoding which includes predetermined quantization parameter 441 corresponding to a quantization step size of one. The video decoder 420 comprises a QP determination module 445 which is configured to determine, for each of the transform blocks 84 of pictures of the video, out of the set of quantization parameters 443 one quantization parameter 447 using which the prediction residual 24 for the respective transform block 84 is quantized and coded into the data stream. Further, the video decoder 420 is configured to perform 54, for each transform block 84, for which the one transform 457 is unequal to the identity transform, a reverse transform of the one transform 457 on residual values 24''' decoded from the data stream for the respective transform block. The video decoder 420 is further configured to perform 52, for each transform block 84, for which the one quantization 447 parameter is unequal to the predetermined quantization parameter, a scaling of quantization indices 24'' decoded from the data stream for the respective transform block so as to obtain the residual values 24'''. Further, the video decoder 420 is configured to decode 50 the quantization indices 24'' from the data stream 14 using context-adaptive binary arithmetic decoding. The video decoder 420 is configured to support a set of parametrizations 433 of the context-adaptive binary arithmetic decoding. The video decoder 420 comprises a parametrization determination module 435 which is configured to determine, for each of the transform blocks of pictures of the video or for each sub-block 84a into which the respective transform block 84 is subdivided or for each quantization index of the respective transform block 84, out of the set of parametrizations 433 one parametrization 437 using which the context-adaptive binary arithmetic decoding is parametrized.

The picture 12' may be subdivided into transform blocks 84, as explained with respect to FIG. 3. The decoding and reconstruction of the picture 12' may be performed transform block-wise, wherein, optionally, one or more of the transform blocks of the picture 12' may be subdivided into sub blocks (SB). Transform blocks of the picture 12' may be decoded subsequently. A predetermined transform block 84 may be regarded as one of the transform blocks into which the picture 12' is subdivided.

For example, the decoder 420 may perform the determination 455 of the one transform 457 by use of certain syntax elements in the data stream 14 which may be transmitted in the data stream at transform block level, or in units of blocks larger then transform blocks such as coding blocks at units of which the inter/intra prediction decision is done, and, optionally, by use of characteristics of respective transform bock, such as its size or whether same relates to an intra-predicted or inter-predicted portion of the video. In examples, the decoder 420 may use a syntax element signaled in the data stream 14, the syntax element referring to the picture 12' or the video sequence. Additionally or alternatively, the decoder 420 may use a syntax element signaled in the data stream 14, the syntax element referring to a portion of the picture 12', for example a slice.

Similarly, the decoder 420 may perform the QP determination 445 by use of certain syntax elements in the data stream 14 which may be transmitted in the data stream at transform block level, or in units of blocks larger then transform blocks such as coding blocks at units of which the inter/intra prediction decision is done, and, optionally, by prediction from previously used quantization parameters for previous transform blocks.

In examples, the decoder 420 may perform the parametrization determination 435 of the one parametrization 437 by use of certain syntax elements which may be transmitted in the data stream 14. For example, the certain syntax elements may be signaled explicitly for the currently considered transform block 84, or may be signaled for the picture 12', a portion thereof, or the video sequence, to which the transform block 84 belongs. The decoder 420 may apply prediction for determining one or more of the certain syntax elements. In examples, the one or more of the certain syntax elements may be signaled implicitly, so that the decoder 420 may infer one or more of the certain syntax elements from other information of the data stream 14.

For example, the identity transform is a transform which leaves the residual values 24''' unchanged. That is, using the identity transform, a prediction residual signal 24'''' provided by the transform 54 may correspond to the residual values 24'''. In other words, selecting the identity transform may correspond to a skipping of the transformation of the residual values 24'''. In this case, the residual values 24''' may represent residual values in the spatial domain. Selecting the identity transform as the one transform 457 may, in examples, correspond to the TSM.

In examples, one or more syntax elements used for the transform determination 455 may be signaled implicitly. E.g., the decoder 420 may infer one or more of the syntax elements based on characteristics of the picture 12', a portion thereof, e.g. a slice, the currently considered transform block 84 or one or more previously decoded transform blocks.

According to a first alternative, the parametrization determination module 435 is configured to perform the determination of the one parametrization 437 in a manner allowing, for a first predetermined transform block, for which the one transform 457 is equal to the identity transform, the one parametrization 437 to be a first parametrization 431, and for a second predetermined transform block, for which the one transform 457 is unequal to the identity transform, the one parametrization 437 to be the first parametrization 431.

Accordingly, the set of parametrizations 453 may comprise the first parametrization 431. For example, the first parametrization 431 may correspond to the RRC. Thus, the decoder 420 may apply RRC for the first predetermined transform block, for which the TSM may be applied, and for the second predetermined transform block, for which the one transformation 457 is different from the identity transform, that is the transformation 54 is not skipped.

According to a second alternative, the parametrization determination module 435 is configured to perform the determination 435 of the one parametrization 437 for a predetermined transform block 84 in a manner depending on the one quantization parameter 447 determined for the predetermined transform block 84.

According to a third alternative, the parametrization determination module 435 is configured to perform the determination of the one parametrization 437 for a predetermined transform block 84 in a manner depending on one or more first syntax elements 416 in the data stream 14 which are disjoint to one or more second syntax elements 418 depending on which the decoder 420 is configured to perform the determination 455 of the one transform 457 for the predetermined transform block 84.

In examples, the one or more first syntax elements 416 comprise a parametrization flag which is indicative of the one parametrization 437. In examples, the parametrization flag is indicated on slice level, that is, the parametrization flag refers to a portion of the picture 12', the portion being referred to as slice, to which the predetermined transform block 84 belongs. In other examples, the parametrization flag be signaled on transform block level, or on sub block level. In examples, the parametrization flag indicates on slice level, whether the one parametrization 437 is the first parametrization 431, e.g. RRC, or a second parametrization, e.g. TSRC, e.g sh_ts_residual_coding_disabled_flag=1 or 0.

For example, the one or more second syntax elements 418 comprise a transform flag which is indicated of the one transform 457. For example, the transform flag indicates, whether the one transform 457 is the identity transform or not. E.g., the transform flag is referred to as transform skip flag, transform_skip_flag. In examples, the transform flag is indicated on transform block level, or the transform flag may refer to the predetermined, transform block 84. The one or more second syntax elements 418 may optionally be signaled in the bit stream 14. Alternatively, the video decoder 420 may be configured to infer one or more of the one or more second syntax elements 418, e.g. under consideration of certain syntax elements signaled in the bit stream 14, for example under consideration of one or more high level and/or one or more low level syntax elements.

In examples, the video bitstream 14 comprises a TSRC enabled flag, e.g. sps_ts_enabled, and a prediction mode flag, e.g. a BDPCM flag. The video decoder 420 may infer the transform flag in dependence on the TSRC enabled flag and the prediction mode flag, for example, if the TSRC enabled flag indicates, that TSRC is enabled for the currently considered video sequence.

In examples, the second syntax elements comprise a prediction mode flag, e.g. BDPCMflag, which indicates whether an intra-prediction mode is to be used for prediction or not. Additionally or alternatively, the second syntax elements may comprise a intra_bdpcm_luma_flag, depending on which the prediction mode flag may be set or inferred. For example, the transform flag may be inferred from the prediction mode flag, if the transform flag is not present in the data stream.

According to a fourth alternative, the parametrization determination module 435 is configured to perform the determination of the one parametrization 437 depending on one or more previously decoded quantization indices 24''.

The first to fourth alternative for the parametrization determination module 435 may be implemented individually in the determination of the one parametrization 437. Alternatively, one or more of the first to fourth alternatives may apply for the parametrization determination module 435.

Figure 5:
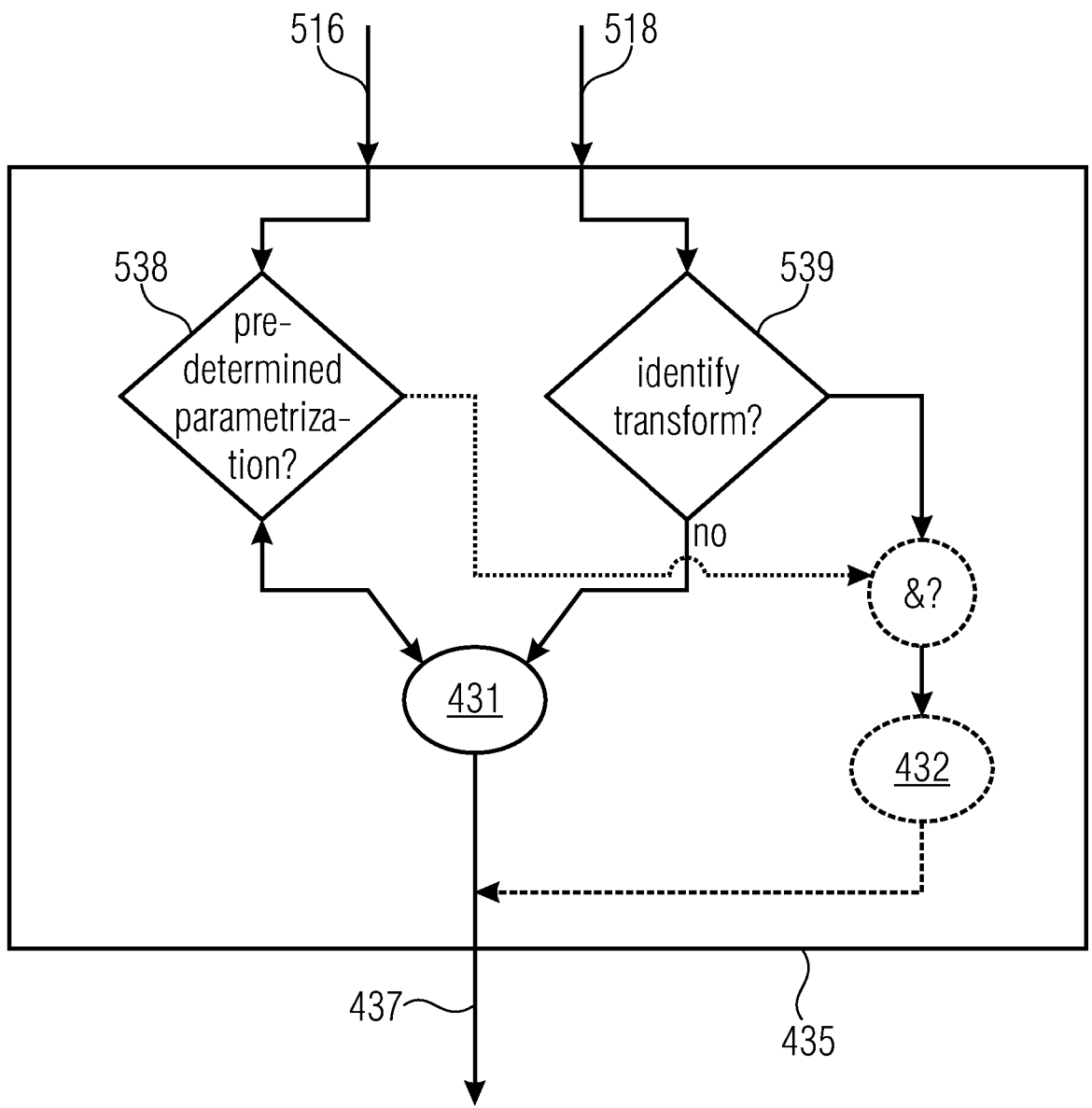
FIG. 5 illustrates a parametrization determination 435 according to an embodiment.

FIG. 5 illustrates an example for an operation scheme of the parametrization determination 435. According to this example, the parametrization determination 435 comprises a parametrization flag evaluation 538 to evaluate a parametrization flag 516, e.g. the parametrization flag described above, which may belong to the one or more first syntax elements 416. Further, the parametrization determination 435 may comprise a transform flag evaluation 539 to evaluate a transform flag 518, e.g. the transform flag as described above, which may belong to the one or more second syntax elements 418. The parametrization flag 516 indicates, whether the one parametrization 437 to be chosen is a predetermined parametrization of the set of parametrizations 433 or not. The predetermined parametrization may be the first parametrization 431. In this case, the parametrization determination 435 may determine the one parametrization 437 to be the first parametrization 431, if the parametrization flag 516 indicates that the one parametrization 437 is the predetermined parametrization. Alternatively, the predetermined parametrization may be a different parametrization, for example a second parametrization 432 of the set of parametrizations 433. In this latter case, the parametrization determination 435 may, in example, determine the one parametrization 437 to be the first parametrization 431, if the parametrization flag 516 indicates that the one parametrization 437 is not the predetermined parametrization. For example, the set of parametrizations 433 comprises a second parametrization 432, for example TSRC. According to this example, the parametrization flag 516 may indicate, whether the one parametrization 437 does not correspond to the second parametrization 432, and if this condition is true, the parametrization determination 435 may determine the one parametrization 437 to be the first parametrization 431, e.g. RRC. The transform flag 518 may indicate whether the one transform 457 is the identity transform or not. The transform flag evaluation 539 may determine the one parametrization 437 to be the first parametrization 431, e.g. RRC, if the transform flag 518 indicates, that the one transform 457 is not the identity transform.

Continuing with the description of FIG. 4, and being applicable to the example of FIG. 5, the set of parametrizations 433 may optionally comprise a second parametrization 432. In this example, the parametrization determination 435 may determine the one parametrization 437 in a manner allowing, for the first predetermined transform block 84, for which the one transform 457 is equal to the identity transform, the one parametrization 437 to be selected out of the first parametrization 431 and the second parametrization 432.

According to a further embodiment, the video decoder is configured to perform the determination 435 of the one parametrization 437 for the predetermined transform block 84 in a manner depending on one or more first syntax elements 416 in the data stream which are disjoint to one or more second syntax elements 418 depending on which the decoder is configured to perform the determination 455 of the one transform 457 for the predetermined transform block 84, by checking whether the one or more first syntax element 416 has a first state and the one transform 457 determined for the predetermined transform block 84 is equal to the identity transform. If the one or more first syntax element 416, e.g. sh_ts_residual_coding_disabled_flag, has the first state, e.g. 1, and the one transform 457 determined for the predetermined transform block 84 is equal to the identity transform, the parametrization determination 435 may determine the one parametrization 437 to be a first parametrization 431, e.g. RRC. If the one or more first syntax element 416, e.g. sh_ts_residual_coding_disabled_flag, does not have the first state, e.g., sh_ts_residual_coding_disabled_flag=0, and the one transform 457 determined for the predetermined transform block is equal to the identity transform, the parametrization determination 435 may determine the one parametrization 437 to be the second parametrization 432.

For example, referring to the example of FIG. 5, the parametrization determination 435 may optionally determine the one parametrization 437 to be the second parametrization 432, e.g. TSRC, if the transform flag 518 indicates, that the one transform 457 is the uniform transform and if the parametrization flag 516 indicates, that the one parametrization 437 is not to be the first parametrization 431. Thus, if the parametrization flag 516 indicates, that the one parametrization 437 is to be the first parametrization 431, the parametrization 435 may select the first parametrization 431 independent of the one parametrization 457.

In some examples of the previous embodiment, the video decoder 420 is further configured to decode the quantization indices 24" from the data stream using context-adaptive binary arithmetic decoding in a manner so that a number of context coded bins of a binarization of the quantization indices 24" per transform block is restricted to a predetermined number of bins with using an equi-probability bypass mode for further bins of the binarization of the quantization indices 24". Optionally, in these examples, the second parametrization has coincides with the first parametrization in one or more of (i) a scan order at which the quantization indices for the predetermined block are decoded from the data stream, and (ii) performing the decoding of the quantization indices with respect to all residual values.

According to a further embodiment of the video decoder 420 of FIG. 4, the video decoder is configured to, if the one transform 457 determined for the predetermined transform block 84 is unequal to the identity transform, determine the one parametrization 437 to be the first parametrization 431. For example, FIG. 5 provides an example for this embodiment.

In a preferred embodiment of the invention, a high-level flag (example for "one or more first syntax elements") indicating the usage of RRC or TSRC is implemented allowing the usage of RRC for TSM and/or TSRC for non-TSM modes.

In a further preferred embodiment of the invention, a high-level syntax scheme is employed indicating the usage of RRC or TSRC for a specific area of the current picture. For example, the usage can be realized by using a list of coding unit indices, denoting the coding units using the alternative residual coding scheme.

In a further preferred embodiment of the invention, a low-level flag (example for "one or more first syntax elements") indicating the usage of RRC or TSRC is implemented allowing the usage of RRC for TSM and/or TSRC for non-TSM modes. The signaling level can be coding unit, prediction unit, and/or transform unit.

According to an embodiment, the video decoder 420 of FIG. 4 is configured to perform the determination 435 of the one parametrization 437 for the predetermined transform block 84 in a manner depending on the one quantization parameter 447 determined for the predetermined transform block, by checking whether the one quantization parameter 447 determined for the predetermined transform block 84 has a predetermined relationship, e.g. is equal to or is equal to or corresponds to a QP of finer quantization accuracy relative, to the predetermined quantization parameter and the one transform 457 determined for the predetermined transform block is equal to the identity transform, If the one quantization parameter 447 determined for the predetermined transform block has the predetermined relationship to the predetermined quantization parameter and the one transform 457 determined for the predetermined transform block is equal to the identity transform, determine the one parametrization 437 to be a first parametrization. If the one quantization parameter 447 determined for the predetermined transform block does not have the predetermined relationship to the predetermined quantization parameter and the one transform 457 determined for the predetermined transform block is equal to the identity transform, determine the one parametrization 437 to be a second parametrization 432. The first parametrization 431 and the second parametrization 432 may be implemented as described in the respective section. Optionally, according to this embodiment, the video decoder 420 is configured to decode 50 the quantization indices 24" from the data stream 14 using context-adaptive binary arithmetic decoding in a manner so that a number of context coded bins of a binarization of the quantization indices 24" per transform block is restricted to a predetermined number of bins with using an equi-probability bypass mode for further bins of the binarization of the quantization indices 24", wherein the second parametrization 432 has coincides with the first parametrization 431 in one or more of (i) a scan order at which the quantization indices 24" for the predetermined block are decoded from the data stream, and (ii) performing the decoding of the quantization indices 24" with respect to all residual values 24'''.

According to embodiments, the video decoder 420 of FIG. 4 is configured to perform the determination of the one parametrization 437 depending on one or more previously decoded quantization indices 24" by checking whether the one or more previously decoded quantization indices 24" fulfill a predetermined condition and the one transform 457 determined for the predetermined transform block is equal to the identity transform. If the one or more previously decoded quantization indices 24" fulfill the predetermined condition and the one transform 457 determined for the predetermined transform block is equal to the identity transform, determine the one parametrization 437 to be a first parametrization. If the one or more previously decoded quantization indices 24" do not fulfill the predetermined condition and the one transform 457 determined for the predetermined transform block is equal to the identity transform, determine the one parametrization 437 to be a second parametrization 432. The first parametrization 431 and the second parametrization 432 may be implemented as described in the respective section. Optionally, according to this embodiment, the video decoder 420 is configured to decode 50 the quantization indices 24" from the data stream 14 using context-adaptive binary arithmetic decoding in a manner so that a number of context coded bins of a binarization of the quantization indices 24" per transform block is restricted to a predetermined number of bins with using an equi-probability bypass mode for further bins of the binarization of the quantization indices 24", wherein the second parametrization 432 has coincides with the first parametrization 431 in one or more of (i) a scan order at which the quantization indices 24" for the predetermined block are decoded from the data stream, and (ii) performing the decoding of the quantization indices 24" with respect to all residual values 24'''.

According to a further embodiment, the video decoder 420 is configured to, if the one transform 457 determined for the predetermined transform block is unequal to the identity transform, determine the one parametrization 437 to be a third parametrization. The third parametrization differs from the first and second parametrizations by one or more of (i) a scan order at which the quantization indices 24" for the predetermined block are decoded from the data stream, and (ii) in case of the third parametrization, decoding of a predetermined residual value position information from the data stream, inferring that residual values 24''' which are located, according to the scan order, upstream relative to the residual value position information are zero, and performing the decoding of the quantization indices 24" with respect to residual values 24''' which are located, according to the scan order, downstream relative to the residual value position information, and in case of the first and second parametrizations, performing the decoding of the quantization indices 24" with respect to all residual values 24'''.

For example, the predetermined condition in the previous embodiment or the above described embodiment relating to the fourth alternative is one of (i) if a set of previously decoded quantization indices 24" residing within a predetermined previously decoded portion, such as within a sub-block of the predetermined transform block or within a further transform block, predetermined context-adaptively coded bins of a binarization of the set of previously decoded quantization indices 24" are all one, (ii) if a set of previously decoded quantization indices 24" residing within a predetermined previously decoded portion, such as within a sub-block of the predetermined transform block or within a further transform block, yield higher a compression rate if, for the set of previously decoded quantization indices 24", the determination of the Rice parameter for a Rice code of a binarization of a quantization index of a predetermined residual value, which yields bypass coded bins for the predetermined residual value, depends on a higher number of previously decoded residual values 24''' than on a lower number of previously decoded residual values 24''', (iii) if a set of previously decoded quantization indices 24" residing within a predetermined previously decoded portion, such as within a sub-block of the predetermined transform block or within a further transform block, yield higher a prediction accuracy rate if, for the set of previously decoded quantization indices 24", a predetermined residual value, whose bins are decoded in the equi-probability bypass mode exclusively, is predicted depending on neighboring previously decoded residual values 24''' of the predetermined transform block than depending on a transition state used to dequantize the quantization values of the residual values 24''' of the predetermined transform block using dependent quantization by selecting one of two quantizers for a quantization index currently to be dequantized using the transition state and updating the transition state depending on the quantization index currently to be dequantized.

Description of the First Parametrization 431 and Second Parametrization 432

In the following, examples of the first parametrization 431 and the second parametrization 432 and the differences between the two are described.

The first parametrization 431 and the second parametrization 432 may, for example, differ in a scan order at which the quantization indices 24" for the predetermined block 84 are decoded from the data stream. For example, the scan order may define an order of the decoding of the quantization indices 24" with respect respective positions of the quantization indices 24" in the transform block 84.

Additionally or alternatively, the first parametrization 431 and the second parametrization 432 may differ in the following: In case of the first parametrization 431, the decoding 50 may comprise a decoding of a predetermined residual value position information from the data stream. For example, the predetermined residual value position information may be indicative of a position of a last significant coefficient, e.g. a last significant residual value 24'''. Thus, in case of the first parametrization 431, the decoder 420 may infer that residual values 24''' which are located, according to the scan order, upstream relative to the residual value position information are zero. In this case, the decoding of the quantization indices 24" may be performed with respect to residual values 24''' which are located, according to the scan order, downstream relative to the residual value position information. In contrast, in case of the second parametrization 432, the decoder 420 may perform the decoding of the quantization indices 24" with respect to all residual values 24'''.

The decoding 50 of the quantization indices 24" from the data stream 14 may rely on a binarization scheme using which the quantization indices 24" are coded into the data stream 14. The binarization scheme may include one or more of truncated unary binarization and Rice codes. One or more of a number of bins of the data stream 14 into which one or more of the quantization indices 24" are coded, maybe coded into the data stream 14 by means of one or more contexts.

The binarization of the quantization indices 24" may include one or more of a significance flag, e.g. sig_flag, a sign flag which may indicate a sign, and one or more greater than X flags, which indicates whether the value of the quantization index to be decoded is greater than X, a parity flag indicating a parity of the quantization index to be decoded.

According to embodiments, the video decoder 420 is configured to decode a sign bit (e.g. indicating the sign flag) of a predetermined residual value of the predetermined transform block 84 at a bin position following a greater than two flag and in a within sub-block scanning pass which follows a scanning pass within which the greater than two flag is decoded.

For example, the decoding 50 of the quantization indices 24" may be performed in one or more scan passes. For example, in one of the scan passes, contributions to the quantization indices 24" for positions within the currently considered transform block 84 may be decoded from the data stream 14 according to the scan order. In each of the scan passes, one or more bins may be decoded from the data stream 14 for a considered quantization index 24" so as to obtain the contribution to the considered quantization index 24". For example, the scan passes may be performed sub-block wise. That is, for each of sub blocks of the currently considered transform block 84, the one or more scan passes may be performed so as to obtain the quantization indices 24" for the positions within the respective sub block.

In examples, the decoding 50 of the quantization indices 24" from the data stream 14 uses context-adaptive binary arithmetic decoding in a manner so that a number of context coded bins of a binarization of the quantization indices 24" per transform block 84 is restricted to a predetermined number of bins, e.g, a CCB budget, with using an equi-probability bypass mode for further bins of the binarization of the quantization indices. In other words, for example, the further bins of the binarization which exceed the predetermined number of bins maybe coded into the data stream 14 using equivalent probabilities.

As mentioned before, the first parametrization 431 may be RRC, and the second parametrization 432 may be TSRC. Accordingly, the first parametrization 431 and the second parametrization 432 may differ in the above described differences between RRC and TSRC, and may additionally or alternatively differ in one or more of the following aspects:

The reason why RRC delivers higher compression efficiency for camera-captured content in TSM, e.g. in comparison with TSRC, are manifold and three aspects can be identified:

1. The number of greater than flags, or the first binarization bound specifying the transition between Truncated Unary binarization and Rice codes.
2. The Rice parameter derivation for the selection of a Rice code.
3. The coefficient prediction scheme that is used in the TSRC.

For example, the second parametrization 432 may differ from the first parametrization 431 by a number of residual values 24''' for which no bin of the binarization of its quantization index 24" belongs to the context coded bins. This number of residual values 24''' may be higher in case of the first parametrization than in case of the second parametrization. For example, the first parametrization 431 may use a different binarization having a higher number of greater-than-X flags, with X being an integer greater than 1, which are context adaptively coded. In other examples, the first parametrization 431 may use a different binarization having a lower number of greater-than-X flags, with X being an integer greater than 1, which are context adaptively coded.

For example, referring to the case of the first parametrization 431 being RRC and the second parametrization 432 being TSRC, this difference may be implemented as follows:

When coding a higher number of greater flags, or setting the first binarization bound high, the CCB budget is used up for high bit rates and lossless modes quickly so that the remaining samples within the transform block are fully coded with Rice codes. However, the coding of the significance flag is extremely efficient due to the large sample values, and hence, the probability distribution of that flag is extremely skewed. In TSRC, due to the additional second coding loop transmitting greater flags, the CCB budget is used up earlier than in the RRC case so that less significance flags are coded. On the other hand, the additional greater flags are not as efficient as the significance flags in terms of compression ratio. There is an optimum trade-off between the number of greater flags and the operation points, and an optimized approach is the selection of an appropriate number of flags depending on the operation point and content. For the lossless case, the optimum number of additional greater flags in TSRC is equal to two. Instead of keeping the number of additional greater flags fixed either depending or independent from the operation mode, an alternative is the backward-adaptive decision on the number of additional greater flags within a transform block. For example, the number of additional greater flags is equal to four at the beginning of a transform block. When for a SB all additional greater flags occur with values equal to one, the limit may be reduced for the next SB within the transform block. As a further alternative, the number of additional greater flags starts with a fixed value, e.g., the value is equal to four, and depending on the previous SB and/or transform block, the value is kept or decreased. Note that the value is reset at the beginning of a coding unit that is the first coding unit of a coding structure. Finally, the number of additional greater flags may be adaptive for each sample position, and the reset to a default value can be at the beginning of a SB, and/or a transform block, and/or the first coding unit of a coding structure.

Additionally or alternatively, the second parametrization 432 may differ from the first parametrization 431 by a determination of a Rice parameter for a Rice code of a binarization of a quantization index of a predetermined residual value, which yields bypass coded bins for the predetermined residual value, depends on a higher number of previously decoded residual values in case of the first parametrization than in case of the second parametrization.

For example, referring to the case in which the first parametrization 431 is RRC and the second parametrization 432 is TSRC, the determination of the Rice parameter for the Rice code of the binarization of the quantization index of the predetermined residual value may be performed as follows:

The Rice parameter derivation for natural content in RRC uses five neighboring samples, whereas only two neighboring samples are employed in TSRC. For natural content, the gradient among the neighboring samples are usually smooth and gradual, whereas the opposite occurs for screen content. Therefore, only two neighboring samples is sufficient for screen content, whereas considering five neighboring samples leads to an averaging effect that is suitable for camera captured content. The mapping from the neighboring sample values to the actual Rice code is also different between RRC and TSRC. For the lossless operation mode, the RRC rice mapping is more suitable, whereas the TSRC rice mapping is suitable for screen content. A solution to overcome the aspect is the usage of the QP, i.e., derive the information whether the QP is lower or equal to the limit QP for TSM. In the latter case, the lossless operation mode can be inferred, and the RRC rice mapping is used for TSRC, whereas in the other cases, i.e., in lossy modes, the TSRC rice mapping is used. This approach solves the most inefficiency of TSRC for lossless. However, the lossless results for screen content suffers from the approach. Alternatively, the Rice mapping table used for a SB is derived depending on the previous SB, e.g., given the decoded sample values, it is detected whether the RRC or the TSRC mapping was better and the better one is used for the current SB. The backward-adaptive approach can be extended for a transform block, and/or for a group of coding units forming a coding structure.

Additionally or alternatively, the second parametrization 432 may differ from the first parametrization 431 by a predictive decoding of a predetermined residual value 24''', whose bins are decoded in the equi-probability bypass mode exclusively, by predicting the predetermined residual value depending on a Rice parameter for a Rice code of a binarization of a quantization index of the predetermined residual value, in case of the first parametrization, but not in case of the second parametrization.

Additionally or alternatively, the second parametrization 432 may differ from the first parametrization 431 by a decoding of a sign bin of a predetermined residual value of the predetermined transform block in the equi-probability bypass mode in case of the first parametrization, and in a context adaptive coded manner in case of the second parametrization.

Additionally or alternatively, the second parametrization 432 may differ from the first parametrization 431 by decoding a significance bin of a predetermined residual value of the predetermined transform block, which indicates whether the predetermined residual value is zero or not, context-adaptively using a context determined depending on a higher number of previously decoded residual values in case of the first parametrization than in case of the second parametrization. That is, for example, a position of the significance bin, e.g. a sig_flag, in a sequence of context coded bins from which a quantization index 24'' is decoded, is different in the case of the second parametrization 432 compared to the case of the first parametrization 431.

Additionally or alternatively, as described above, the first parametrization 431 and the second parametrization 432 may differ by a coefficient prediction scheme. For example, in the second parametrization 432, e.g. TSRC, one or more previously decoded quantization indices 24'' may be used to predict a currently considered quantization index 24''. For example, a left neighboring quantization index and a top neighboring quantization index may be used for determining the currently considered quantization index 24''.

In examples, the coefficient prediction is used in both residual coding schemes, but they work differently. In RRC, the coefficient prediction is applied for samples that are coded completely in bypass mode. Depending on the Rice parameter, the semantic is switched between two bin strings as follows. Given the current TCQ state, a value is derived and the value is left shifted by the Rice parameter and the resulting value represents the first codeword of the Rice code whereas the its corresponding bin string represents the first value that is equal to zero. For TSRC, the coefficient prediction employs the template evaluating two neighboring samples and uses the one that has the higher value as the predictor. While the RRC scheme works well for camera-captured content, the TSRC scheme works well for screen content. Similar to the Rice parameter derivation, the QP can be used to determine the usage of the RRC coefficient prediction. Alternatively, when the lossless operation mode is detected, the absolute difference between the two neighboring predictors can be compared and the coefficient prediction is disabled when the difference is smaller than a threshold value. This example of coefficient prediction may also be implemented in predicting the predetermined residual value depending on neighboring previously decoded residual values of the predetermined transform block depending on a transition state used to dequantize the quantization values of the residual values 24''' of the predetermined transform block, as described below.

Similar to the template for the Rice parameter, the context modeling for the other syntax element using the template such as the significance flag in RRC employs five neighboring samples instead of two. A similar effect as described above occurs also for camera captured content using TSM, so that an extension to five neighboring samples for the template in TSRC benefits the compression efficiency. Note that the extension to five neighboring samples for the template in TSRC does not harm the lossy operation modes in terms of compression efficiency, except the introduction of additional complexity.

Another special case in TSRC is the coding of the sign information with context models. It has benefit in terms of compression efficiency for screen content, but it does not work well for camera-captured content using TSM. Hence, when considering the compression efficiency aspect only, it is desirable to disable the scheme, i.e., coding the sign syntax element in the bypass mode.

The parity information is useful when the trellis-based coding is employed, a trellis-based quantization together with the state information for context modeling. However, since the lack of quantization in the lossless operation mode, it is beneficial to remove the parity information. By removing the parity information, the distribution of the remaining coefficient levels does not become shrink allowing a more efficient Rice parameter derivation. However, since a similar syntax between RRC and TSRC is desirable, hence, as an alternative, the syntax elements greater than two and sign are swapped the position within the syntax table. It has also the benefit that the coding of sign is that critical in the lossless operation mode.

In a preferred embodiment of the invention, the number of additional greater flags in TSRC depends on the operation mode and/or operation points.

In a further preferred embodiment of the invention, the number of additional greater flags in TSRC depends on the operation mode and/or operation points. In the case of lossless, the number of additional greater flags is equal to two, whereas in the lossy operation modes, the number of additional greater flags is equal to four.

In a further preferred embodiment of the invention, the number of additional greater flags is adaptive for each transform block. The number of additional greater flags starts with a default value, e.g., the value is equal to four, and depending on the conditions of the previous SB, the number is kept or decreased for the current SB.

In a further preferred embodiment of the invention, the number of additional greater flags is adaptive for a group of coding units forming a coding structure. The number of additional greater flags starts with a default value, e.g., the value is equal to four, and depending on the conditions of the previous SB and/or transform block, the number is kept or decrease for the current SB and/or transform block.

In a further preferred embodiment of the invention, the number of additional greater flags is adaptive for each sample position, and a reset to a default value is at the beginning of each SB.

In a further preferred embodiment of the invention, the number of additional greater flags is adaptive for each sample position, and a reset to a default value is at the beginning of each transform block.

For example, the number of greater flags may depend on the predetermined number of bins to which the number of context coded bins of a binarization of the quantization indices 24" per transform block 84 or per SB may be restricted, as a coding of additional greater flags may be omitted when the predetermined number of bins is exploited. Thus, the number of greater flags for each sample position may depend on a usage of context coded bins for the coding of the currently considered transform block or SB.

In a further preferred embodiment of the invention, the number of additional greater flags is adaptive for each sample position, and a reset to a default value is for the first coding unit of a coding structure.

In a preferred embodiment of the invention, the coding of the sign syntax element in TSRC is without context modelling when the operation mode is lossless, i.e., when the QP is equal to or lower than the limit QP for TSM.

In a preferred embodiment of the invention, the template for context modeling of the syntax element coded using context models is variable and depends on the operation mode identified via TSM and the QP.

In a preferred embodiment of the invention, the TSRC Rice mapping depends on the QP, and the RRC rice mapping is used when the QP is lower or equal to the limit QP for TSM, whereas the TSRC rice mapping is when the QP is not the limit QP for TSM.

In a further preferred embodiment of the invention, the TSRC Rice mapping depends on the QP, and a backward-adaptive selection between the Rice and the TSRC mapping is performed when the QP is lower or equal to the limit QP for TSM.

In a further preferred embodiment of the invention, the TSRC Rice mapping depends on the QP, and a backward-adaptive selection between the Rice and the TSRC mapping is performed when the QP is lower or equal to the limit QP for TSM. The switching level is for every sample position depending on the previous sample positions and/or SBs.

In a further preferred embodiment of the invention, the TSRC Rice mapping depends on the QP, and a backward-adaptive selection between the Rice and the TSRC mapping is performed when the QP is lower or equal to the limit QP for ISM. The switching level is for every sample position depending on the previous sample positions and/or SBs and/or transform blocks.

In a further preferred embodiment of the invention, the TSRC Rice mapping depends on the QP, and a backward-adaptive selection between the Rice and the TSRC mapping is performed when the QP is lower or equal to the limit QP for TSM. The switching level is for every sample position depending on the previous sample positions and/or SBs and/or transform blocks and/or coding units within the same coding structure.

In a preferred embodiment of the invention, the coefficient prediction scheme of RRC is used when TSM and the limit QP is used.

In a further preferred embodiment of the invention, the coefficient prediction scheme of TSRC is employed additionally when the absolute difference between the predictors are below a specific threshold.

In a preferred embodiment of the invention, the coding position of the syntax elements denoting the sign information and the greater than two flag are swapped, resulting in a same syntax of TSRC and RRC for the first coding loop.

Determination of the One Quantization Parameter 447

In the following, examples of the determination 445 of the one quantization parameter 447 are described, which may be combined with any of the previously described embodiments, in particular with the described examples for the parametrization determination 435 and examples for the first parametrization 431 and the second parametrization 432.

According to embodiments, the video decoder 420 is configured to determine, for each of the transform blocks of pictures of the video, out of the set of quantization parameters one quantization parameter 447 using which the prediction residual for the respective transform block is quantized and coded into the data stream, by checking whether the one transform 457 determined for the respective transform block is equal to the identity transform. According to these embodiments, the video decoder 420 is configured to determine, e.g. by prediction from previously used quantization parameters for previous transform blocks, a preliminary quantization parameter, e.g. qP, for the respective transform block. If the one transform 457 determined for the respective transform block 84 is equal to the identity transform, the video decoder 420 is configured to amend the preliminary quantization parameter onto the predetermined quantization parameter if the preliminary quantization parameter corresponds to higher quantization accuracy than the predetermined quantization parameter to obtain the one quantization parameter 447. If the one transform 457 determined for the respective transform block is unequal to the identity transform, the video decoder 420 is configured to use the preliminary quantization parameter as the one quantization parameter 447. For example, the predetermined quantization parameter may refer to as QpPrimeTsMin.

Figure 6:
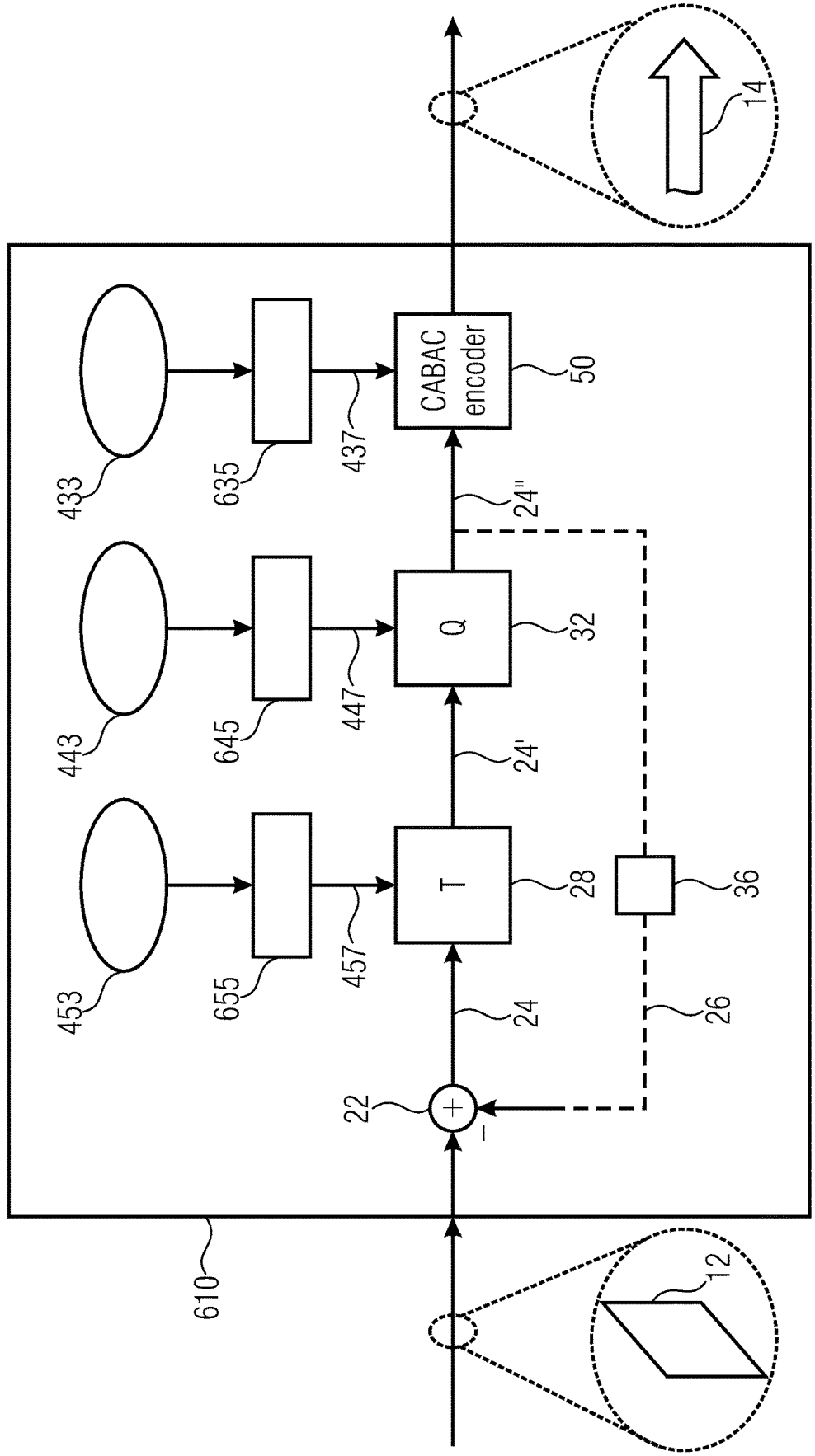
FIG. 6 illustrates a video encoder according to an embodiment.

FIG. 6 shows a block diagram of a video encoder 610 according to an embodiment. The video encoder 610 is configured to encode a video using prediction 36 and transform based residual coding. The video encoder 610 is further configured to support a set of transforms 453 for the transform based residual coding which includes an identity transform. Further, the video encoder 610 is configured to determine 655, for each of transform blocks 84 of pictures 12 of the video, out of the set of transforms 453 one transform 457 at which a prediction residual 24 for the respective transform block 84 is coded into a data stream 14. The video encoder 610 is further configured to support a set of quantization parameters 443 for the transform based residual coding which includes a predetermined quantization parameter corresponding to a quantization step size of one. The video encoder 610 is further configured to determine 645, for each of the transform blocks 84 of pictures 12 of the video, out of the set of quantization parameters 443 one quantization parameter 447 using which the prediction residual for the respective transform block is quantized and coded into the data stream. The video encoder 610 is further configured to perform, for each transform block 84, for which the one transform 457 is unequal to the identity transform, the one transform 457 to yield residual values 24' and code same into the data stream for the respective transform block. The video encoder 610 is further configured to perform, for each transform block 84, for which the one quantization parameter 447 is unequal to the predetermined quantization parameter, a scaling of the residual values 24' prior to rounding so as to obtain quantization indices 24" and code same into the data stream for the respective transform block. The video encoder 610 is further configured to code the quantization indices 24" into the data stream using context-adaptive binary arithmetic encoding. The video encoder 610 is further configured to support a set of parametrizations 433 of the context-adaptive binary arithmetic encoding. The video encoder 610 is further configured to determine 635, for each of the transform blocks of pictures of the video or for each sub-block into which the respective transform block is subdivided or for each quantization index of the respective transform block, out of the set of parametrizations 433 one parametrization 437 using which the context-adaptive binary arithmetic encoding is parametrize. The video encoder is configured to perform the determination 635 of the one parametrization 437 in a manner in accordance with one or more of the following alternatives:

According to a first alternative, the parametrization determination 635 is configured to perform the determination of the one parametrization 437 in a manner allowing, for a first predetermined transform block, for which the one transform 457 is equal to the identity transform, the one parametrization 437 to be a first parametrization, and for a second predetermined transform block, for which the one transform 457 is unequal to the identity transform, the one parametrization 437 to be the first parametrization 431.

According to a second alternative, the parametrization determination 635 is configured to perform the determination of the one parametrization 437 for a predetermined transform block in a manner depending on the one quantization parameter 447 determined for the predetermined transform block.

According to a third alternative, the parametrization determination 635 is configured to perform the determination of the one parametrization 437 for a predetermined transform block in a manner depending on one or more first criterions which are disjoint to one or more second criterions depending on which the encoder is configured to perform the determination of the one transform 457 for the predetermined transform block. Alternatively, the parametrization determination 635 is configured to perform the determination of the one parametrization 437 for a predetermined transform block in a manner depending on one or more first syntax elements 416 in the data stream, i.e. depending on one or more first syntax elements 416 which the video encoder 610 is configured to code into the data stream, the first syntax elements being disjoint to one or more second syntax elements 418 depending on which the encoder is configured to perform the determination of the one transform 457 for the predetermined transform block.

According to a fourth alternative, the parametrization determination 635 is configured to perform the determination of the one parametrization 437 depending on one or more previously encoded quantization indices 24".

The parametrization determination 635 may correspond to the parametrization determination 435, the QP determination 645 may correspond to QP determination 445, and the transform determination 655 may correspond to the transform determination 455, wherein information, which the parametrization determination 435, the QP determination 445, and the transform determination 455 are to retrieve from the data stream 14 may be provided to the parametrization determination 635, the QP determination 645, and the transform determination 655 by the video encoder 610 based on the encoding of the video.

The encoder 620 may match the decoder 420 in a sense as described with respect to the encoder 10 and the decoder 20 of FIG. 1 and FIG. 2. That is, the encoder encodes into the data stream whatever the decoder decodes from the same, the encoder predicts anything in the same manner as the decoder does, the encoder binarizes syntax elements into bins from which the decoder obtains them by debinarization, the encoder transforms the residual and quantizes the coefficients whereas the decoder dequantizes the coefficients and subjects them to a retransformation, the major difference being that the encoder performs a decision on certain coding decisions and syntax element settings such as which transform to use and which quantization setting to use.

Although some aspects have been described as features in the context of an apparatus it is clear that such a description may also be regarded as a description of corresponding features of a method, Although some aspects have been described as features in the context of a method, it is clear that such a description may also be regarded as a description of corresponding features concerning the functionality of an apparatus.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded video bitstream can be stored on a digital storage medium or can be transmitted on a transmission medium such as a wireless transmission medium or a wired transmission medium such as the Internet.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

The above described embodiments are merely illustrative for the principles of the present disclosure. It is understood that modifications and variations of the arrangements and the details described herein will be apparent to others skilled in the art. It is the intent, therefore, to be limited only by the scope of the pending patent claims and not by the specific details presented by way of description and explanation of the embodiments herein.

The invention claimed is:

1. A video decoder comprising:
   a microprocessor; and
   a memory, the memory having program code that, when executed by the microprocessor, causes the video decoder to:
      decode, from a video bitstream, a high-level flag which, when set to a first value, indicates performing regular residual coding (RRC) for all coding units of a specific area of a current picture;
      determine, from the video bitstream, for a transform block (84), whether an inverse transform corresponding to the transform block is an identity transform or not;
      when it is determined that the inverse transform is the identity transform and the high-level flag is set to a second value different from the first value, determine a first Rice parameter for a binarization of a residual transform coefficient of the transform block;
      when it is determined that the inverse transform is not the identity transform or the high-level flag is set to the first value, determine a second Rice parameter for the binarization of the residual transform coefficient of the transform block; and
      decode the residual transform coefficient of the transform block using the first or second Rice parameter.

2. A video encoder comprising:
   a microprocessor; and
   a memory, the memory having program code that, when executed by the microprocessor, causes the video encoder to:
      encode, into a video bitstream, a high-level flag which, when set to a first value, indicates performing regular residual coding (RRC) for all coding units of a specific area of a current picture;
      signal, in the video bitstream for a transform block, whether an inverse transform corresponding to the transform block is an identity transform;
      when the inverse transform is the identity transform and the high-level flag is set to a second value different from the first value, determine a first Rice parameter for a binarization of a residual transform coefficient of the transform block;
      when the inverse transform is not the identity transform or the high-level flag is set to the first value, determine a second Rice parameter for the binarization of the residual transform coefficient of the transform block; and
      encode the residual transform coefficient of the transform block using the first or second Rice parameter.

3. The video encoder of claim 2, wherein the memory has program code that, when executed by the microprocessor, causes the video encoder to:
   determine that content for the video bitstream is camera-captured content; and based on the determination that the content for the video bitstream is camera-captured content, set the high-level flag to the first value.

4. The video encoder of claim 2, wherein the memory has program code that, when executed by the microprocessor, causes the video encoder to:
- determine that content for the video bitstream is screen content; and
- based on the determination that content for the video bitstream is screen content, set the high-level flag to the second value.

5. A method of video decoding, the method comprising:
- decoding, from a video bitstream, a high-level flag which, when set to a first value, indicates performing regular residual coding (RRC) for all coding units of a specific area of a current picture;
- determining from the video bitstream, for a transform block, whether an inverse transform corresponding to the transform block is an identity transform;
- when it is determined that the inverse transform is the identity transform and the high-level flag is set to a second value different from the first value, determining a first Rice parameter for a binarization of a residual transform coefficient of the transform block;
- when it is determined that the inverse transform is not the identity transform or the high-level flag is set to the first value, determining a second Rice parameter for the binarization of the residual transform coefficient of the transform block; and
- decoding the residual transform coefficient of the transform block using the first or second Rice parameter.

6. A non-transitory, computer-readable storage medium storing computer program instructions, which when executed, cause a decoder to perform the steps of: decoding, from a video bitstream, a high-level flag which, when set to a first value, indicates performing regular residual coding (RRC) for all coding units of a specific area of a current picture;
- determining from the video bitstream, for a transform block, whether an inverse transform corresponding to the transform block is an identity transform;
- when it is determined that the inverse transform is the identity transform and the high-level flag is set to a second value different from the first value, determining a first Rice parameter for a binarization of a residual transform coefficient of the transform block;
- when it is determined that the inverse transform is not the identity transform or the high-level flag is set to the first value, determining a second Rice parameter for the binarization of the residual transform coefficient of the transform block; and
- decoding the residual transform coefficient of the transform block using the first or second Rice parameter.

* * * * *